United States Patent [19]

Ito

[11] Patent Number: 4,818,081
[45] Date of Patent: * Apr. 4, 1989

[54] ZOOM LENS SYSTEM FOR USE IN COMPACT CAMERA

[75] Inventor: Takayuki Ito, Tokyo, Japan

[73] Assignee: Asahi Kogaku Kogyo Kabushiki Kaisha, Tokyo, Japan

[*] Notice: The portion of the term of this patent subsequent to Jan. 19, 2005 has been disclaimed.

[21] Appl. No.: 132,084

[22] Filed: Dec. 11, 1987

[30] Foreign Application Priority Data

Aug. 28, 1987 [JP] Japan ................. 62-214709

[51] Int. Cl.[4] ............... G02B 15/14; G02B 9/60
[52] U.S. Cl. ................................ 350/423; 350/426
[58] Field of Search ................... 350/423, 427, 426

[56] References Cited

U.S. PATENT DOCUMENTS 4,720,179  1/1988  Ito .......................... 350/423

FOREIGN PATENT DOCUMENTS 113120  2/1987  Japan.
 78552  6/1987  Japan.
230103  7/1987  Japan.

Primary Examiner—John K. Corbin
Assistant Examiner—Rebecca D. Gass
Attorney, Agent, or Firm—Sughrue, Mion, Zinn, Macpeak and Seas

[57] ABSTRACT

An improved high-performance zoom lens system for a compact camera is disclosed. The lens employs a two-group type configuration composed of a first lens group having a positive focal length inclusive of a stop diaphragm and a second lens group having a negative focal length. To reduce the diameters of the lenses in the rear group, the back focus of the overall lens system is made greater than a predetermined value, while yet the overall lens system remains relatively short.

10 Claims, 20 Drawing Sheets

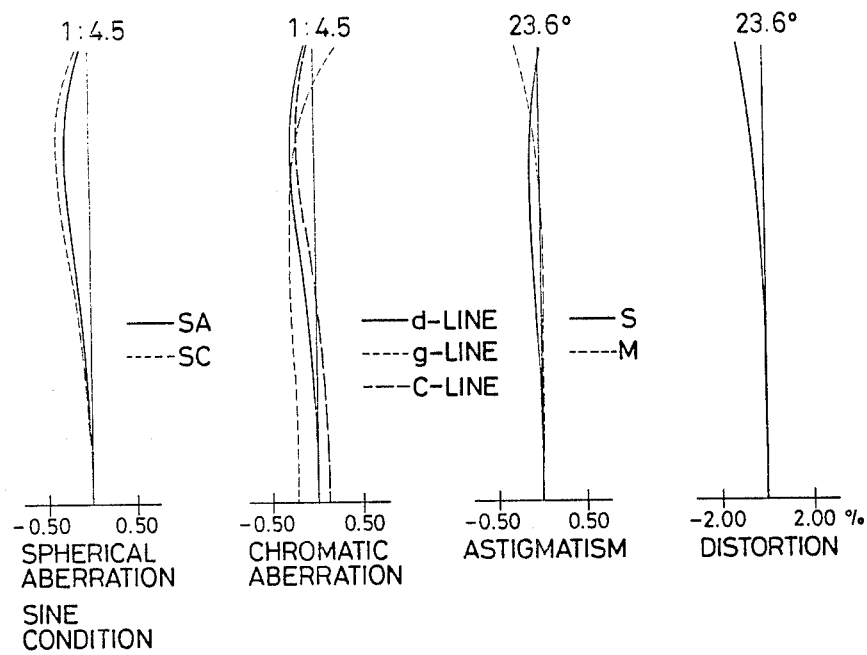
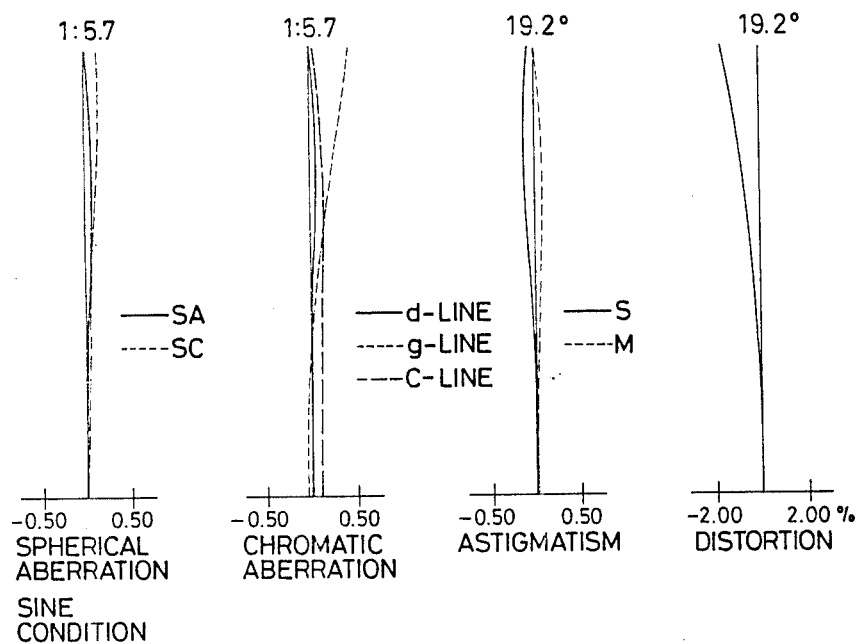

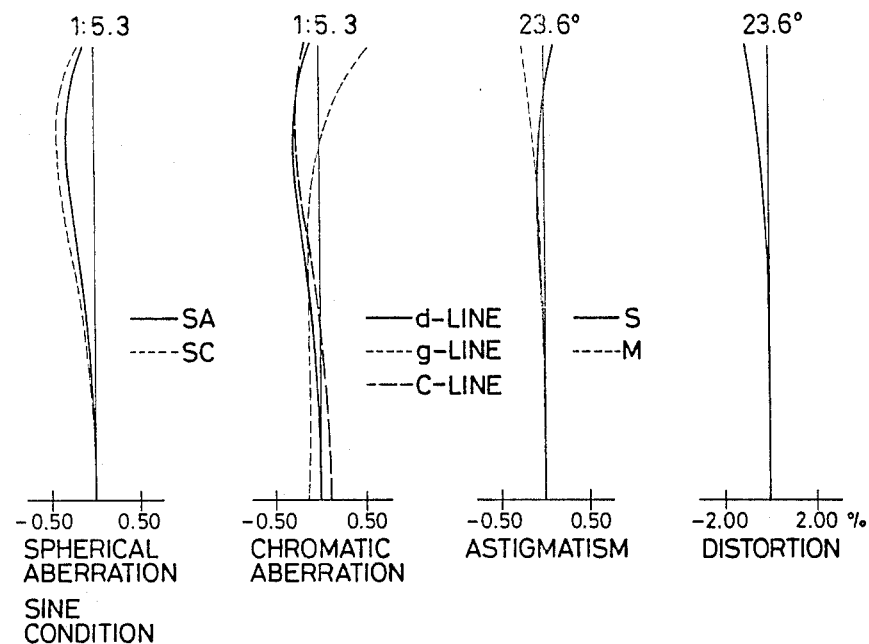
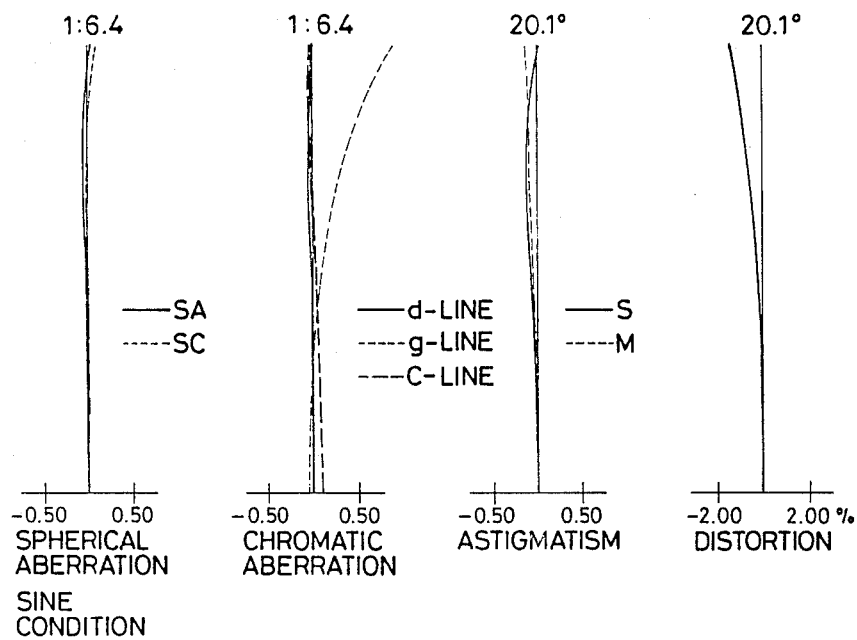

ZOOM LENS SYSTEM FOR USE IN COMPACT CAMERA

BACKGROUND OF THE INVENTION

The present invention relates to a zoom lens system adapted for use in a compact camera and which is subject to less strict conditions on back focus than a lens system used in a single lens reflex camera.

The following three types of zoom lens systems are available for use in compact cameras.

(I) A telephoto two-group type composed of a first lens group having a positive focal length inclusive of a stop diaphragm and a second lens group having a negative focal length. An example of this type of lens system is disclosed Japanese Unexamined Published patent applications Nos. 128911/1981, 201213/1982, 48009/1985 and 170816/1985.

(II) A three group type which is a modification of type (I) and which is composed of a first lens group having a positive focal length inclusive of a stop diaphragm, a second lens group having a positive focal length, and a third lens group having a negative focal length. An example of this lens type is disclosed Japanese Unexamined Published patent application No. 184916/1983.

(III) A four-group type composed of a first lens group having a positive focal length, a second lens group having a negative focal length, a third lens group having a positive focal length, and a fourth lens group having a negative focal length. An example of this lens type is disclosed in Japanese Unexamined Published patent application No. 57814/1985.

These zoom lens systems, however, have the following problems:

The two-group type (I) lens system has a very simple construction, but it requires the first and second lens groups to be displaced by a large amount in order for zooming.

The three-group type (II) lens system only differs from type (I) in that the first lens group is divided into two positive lens units, and hence it also requires a substantial amount of lens displacement for zooming.

The four group type (III) lens system requires a smaller amount of lens displacement than the first two types. However, the use of four lens groups renders the lens configuration very complex. In addition, the individual lens groups, in particular, the second and third groups have such large powers that any slight error introduced in the manufacturing process will cause serious effects on the performance of the resulting lens system. Therefore, this type of lens system is rather difficult to manufacture.

Moreover, all three prior art of zoom lens system types (I), (II), (III) have one common problem: since they are intended to be used in compact cameras, they have no conditions of constraint at all on the back focus. Some have a back focus as short as about 1 mm. In the absence of any constraints on the back focus, a zoom lens system having a reduced overall length can be easily constructed. On the other hand, the diameter of the lenses in the rear group is increased and the dimensions of the camera body, including various mechanisms such as zooming and auto-focusing units, cannot be substantially reduced. A further problem is that internal reflection is highly likely to occur between the film surface and the lens surface in the rear group.

SUMMARY OF THE INVENTION

An object, therefore, of the present invention is to provide a high-performance zoom lens that is suitable for use in a compact camera.

In general, the zooming method employed in the inventive lens system is the same as that used in the prior art two-group type (I). However, in order to reduce the diameters of the lenses in the rear group, the back focus of the overall lens system is made greater than a certain value (so as to satisfy condition (6) to be noted below) while the length of the overall system remains relatively short.

Basically, the zoom lens system for use in a compact camera of the present invention comprises, in order from the object side, a first lens group having a positive focal length and a second lens group having a negative focal length. Zooming is performed in this zoom lens system by changing the distance between the first and second lens group. In this zoom lens system, the first lens group is composed of a first lens unit having a negative focal length that comprises at least one positive lens element and at least one negative lens element, and a second lens unit having a positive focal length that is disposed on the image side of said first lens unit and which comprises at least one negative lens element and at least one positive lens element and the zoom lens system satisfies the following conditions:

$$1.2 < f_s/f_1 < 1.5; \tag{1}$$

$$1.69 < N_{1an}; \tag{2}$$

$$34 < \nu_{1an}; \tag{3}$$

$$-2.0 < f_s/f_{1bn} < -0.7; \tag{4}$$

$$9 < \nu_{1bp} - \nu_{1bn}; \text{ and} \tag{5}$$

$$0.23 < f_{BS}/f_S < 0.5, \tag{6}$$

wherein
$f_s$: the focal length of the overall system at the wide-angle end;
$f_1$: the focal length of the first lens group;
$N_{1an}$: the refractive index at the d-line of the negative lens element in the first lens unit;
$\nu_{1an}$: the Abbe number of the negative lens element in the first lens unit;
$f_{1bn}$: the focal length of the negative lens element in the second lens unit;
$\nu_{1bp}$: the Abbe number of the positive lens element in the second lens unit;
$\nu_{1bn}$: the Abbe number of the negative lens element in the second lens unit; and
$f_{BS}$: the back focus of the overall system at the wide-angle end.

One aspect of present invention relates to a zoom lens system of the present invention in which its back focus is increased so as to reduce the diameter of lenses in the rear group. Moreover, the zoom lens system of the present invention has a shorter overall length and requires a smaller amount of lens displacement for zooming. Therefore, the zoom lens system of the present invention is more compact and inexpensive and yet is capable of effective compensation of aberrations such as coma aberration and distortion.

Hence, another object of the present invention is to provide a zoom lens system that has the features described above and which is adapted for use in a compact In another embodiment, the lens system satisfies:

$$1.35 < f_s/f_1 < 1.7; \quad (1)$$

$$1.69 < N_{1an}; \quad (2)$$

$$34 < \nu_{1an}; \quad (3)$$

$$-2.5 < f_s/f_{1bn} < -1.0; \quad (4)$$

$$9 < \nu_{1bp} - \nu_{1bn}; \quad (5)$$

$$0.31 < f_{BS}/f_S < 0.5; \text{ and} \quad (6)$$

$$-1.0 < f_s/f_{1bc} < -0.41, \quad (7)$$

wherein
in $f_1$, $N_{1an}$, $\nu_{1an}$, $f_{1bn}$, $\nu_{1bp}$, $\nu_{1bn}$, and $f_{BS}$ are defined as above, and $f_{1bc}$: the focal length of the cemented surface of the second lens unit.

BRIEF DESCRIPTION OF THE DRAWINGS

FIGS. 2B, 4B, 6B, 8B, 10B, 12B, 14B, 16B, 18B and 20B are graphs showing the aberration curves obtained at the middle-angle position of zoom lens systems according to Examples 1-10, respectively, of the present invention; and FIGS. 2C, 4C, 6C, 8C, 10C, 12C, 14C, 16C, 18C and 20C are graphs showing the aberration curves obtained at the narrow-angle position of zoom lens systems according to Examples 1, 2, 3, 4 and 5, respectively, of the present invention.

DESCRIPTION OF THE PREFERRED EMBODIMENTS

Figure 1:
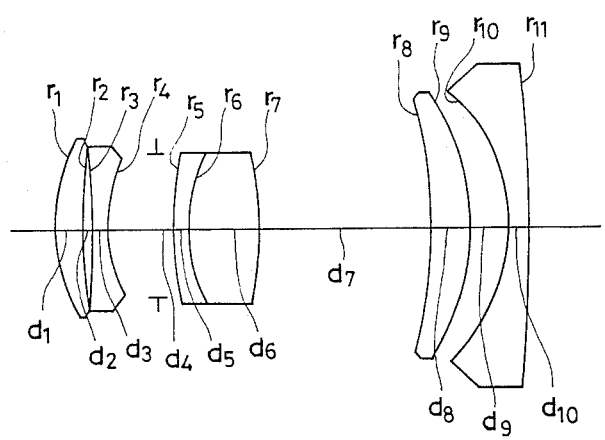
FIGS. 1, 3, 5, 7, 9 11, 13, 15, 17 and 19 are simplified cross-sectional views of zoom lens systems at the wide-angle position constructed according to Examples 1-10, respectively, of the present invention.
Figure 2A:
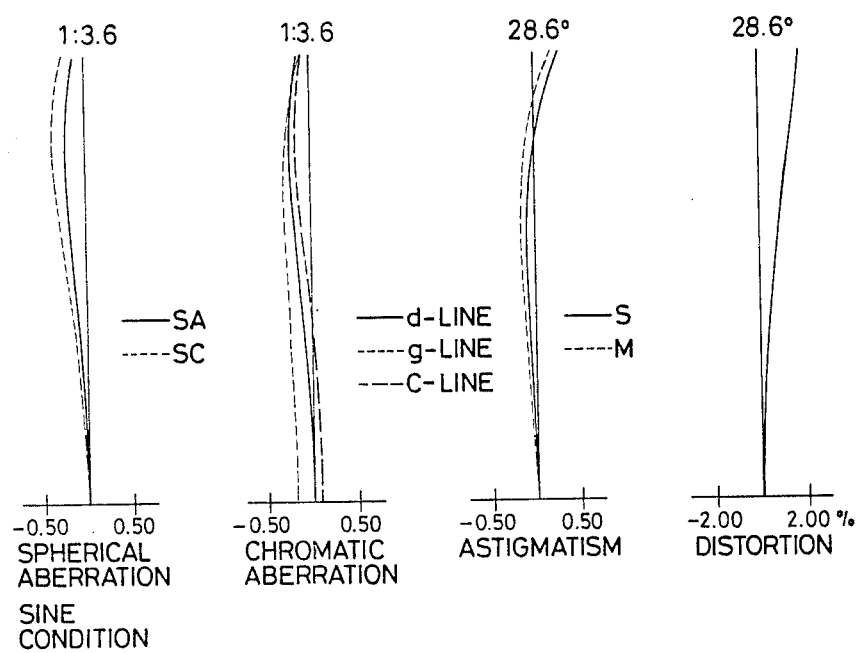
FIGS. 2A, 4A, 6A, 8A, 10A, 12A, 14A, 16A, 18A and 20A are graphs showing the aberration curves obtained at the wide-angle position of zoom lens systems according to Examples 1, 2, 3, 4 and 5, respectively, of the present invention.
Figure 2B:
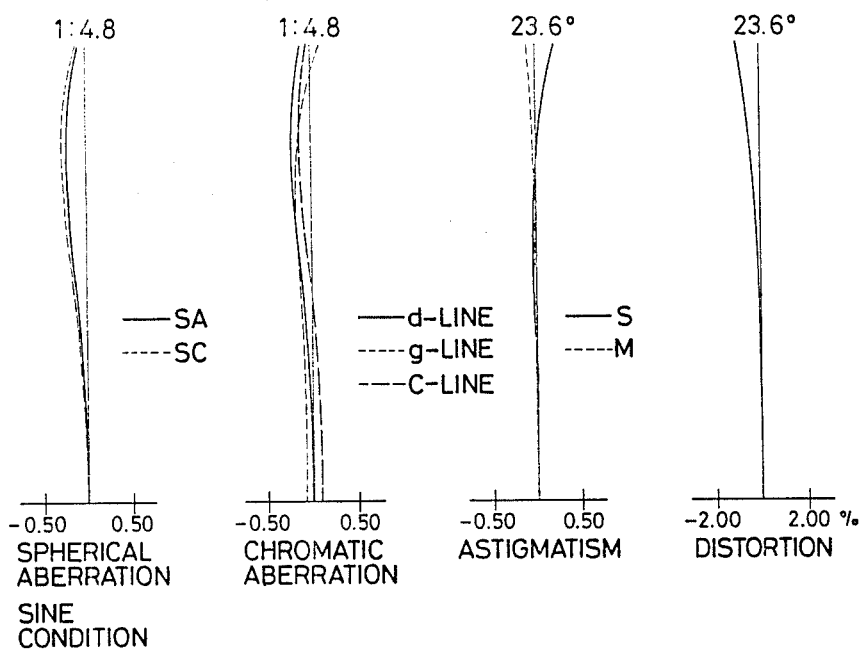
Figure 2C:
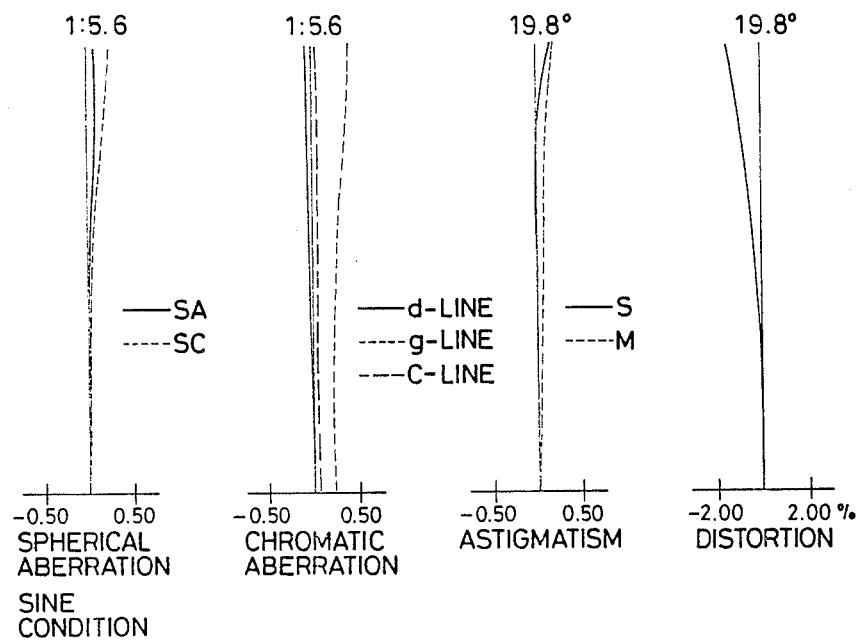
Figure 3:
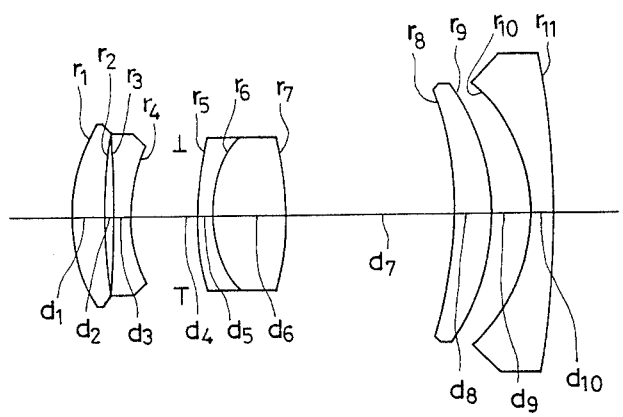
Figure 4A:
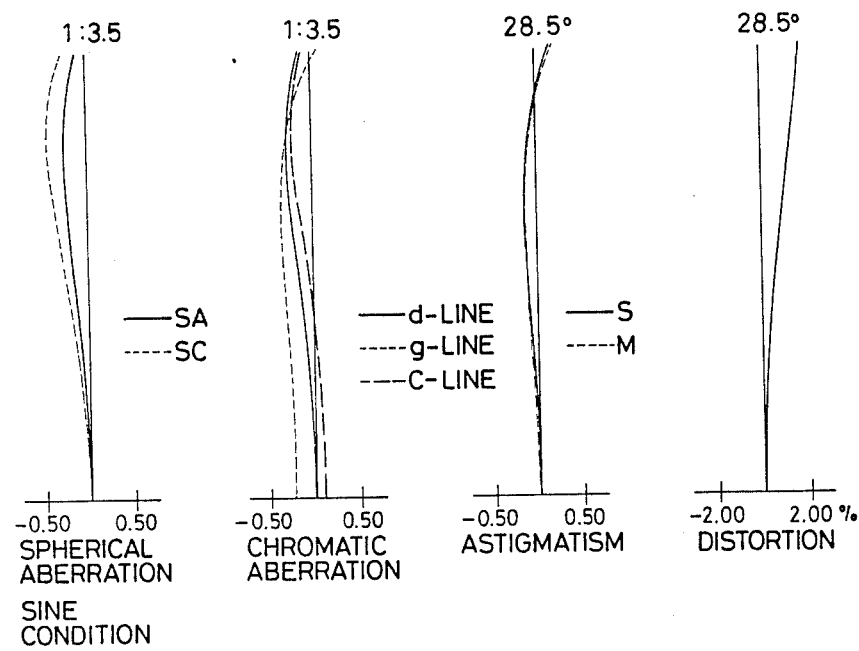
Figure 5:
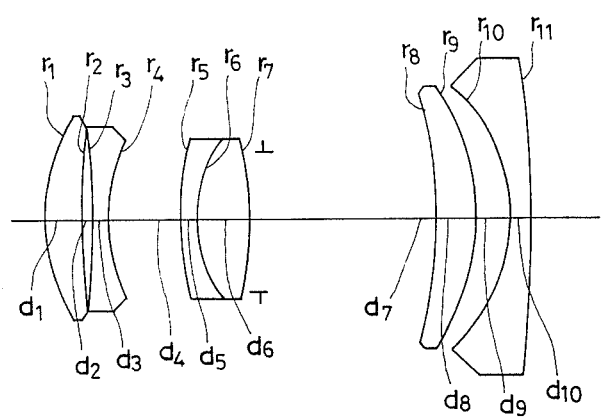
Figure 6A:
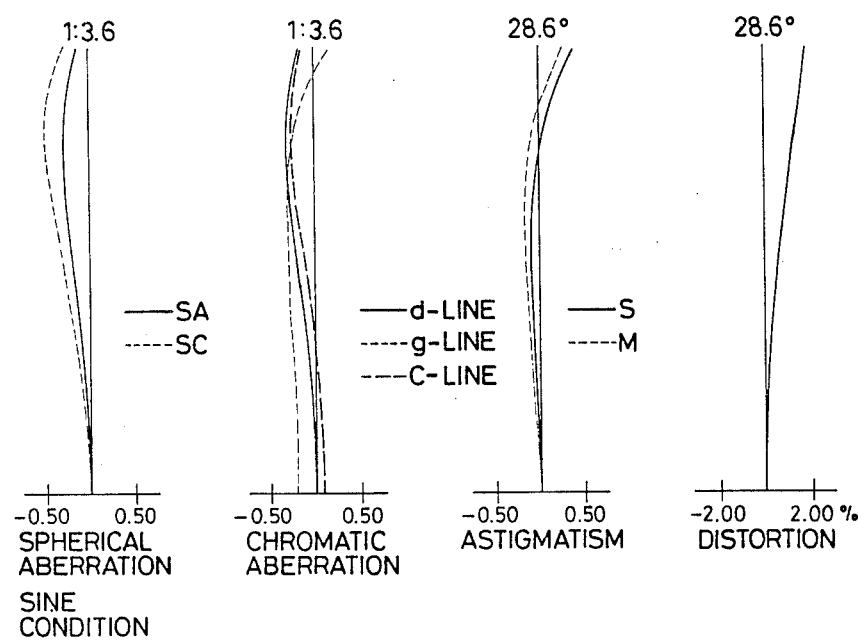
Figure 6B:
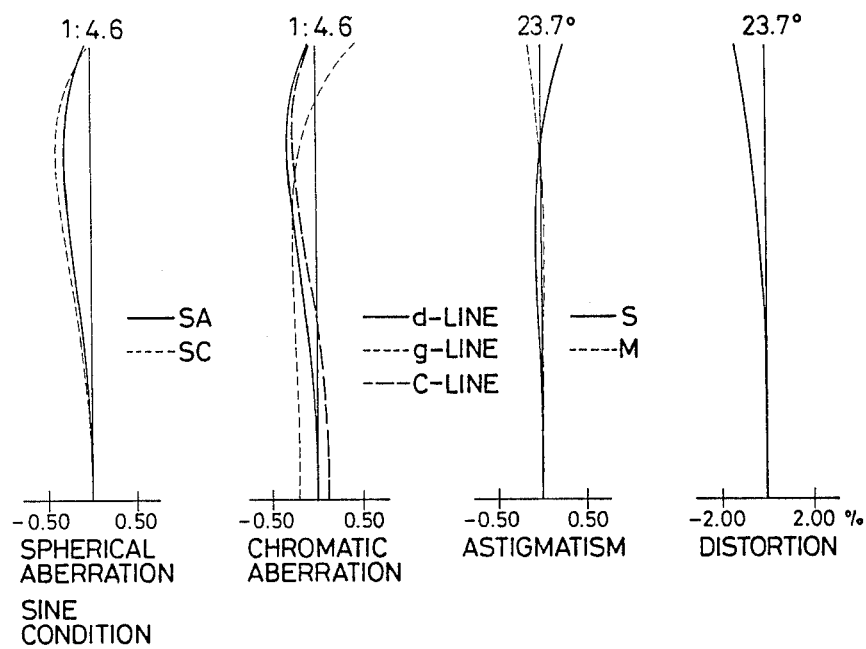
Figure 6C:
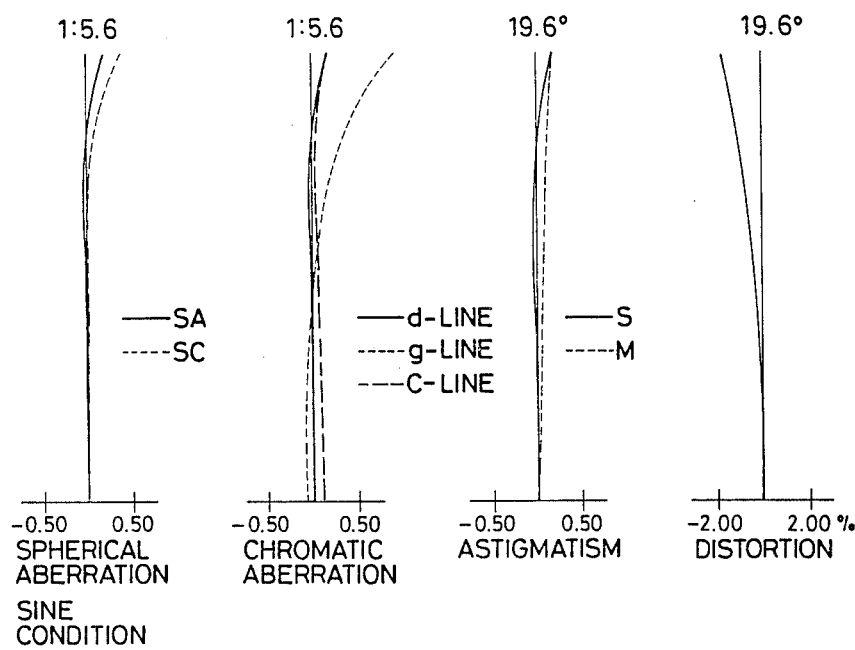
Figure 7:
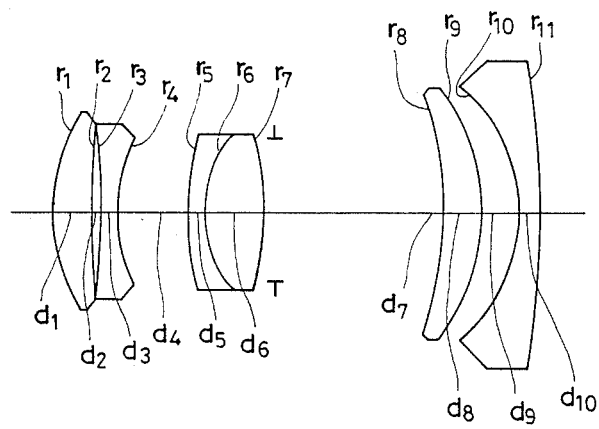
Figure 8A:
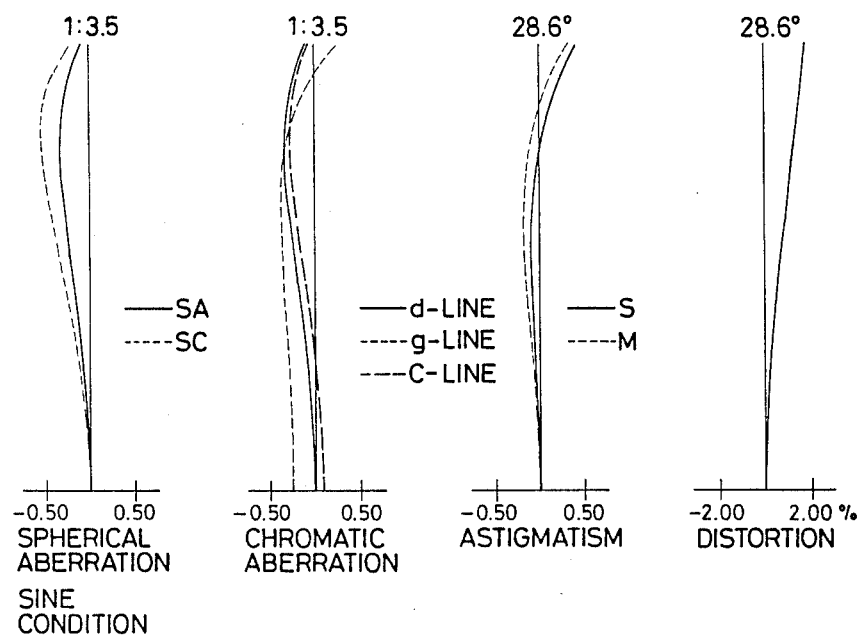
Figure 8B:
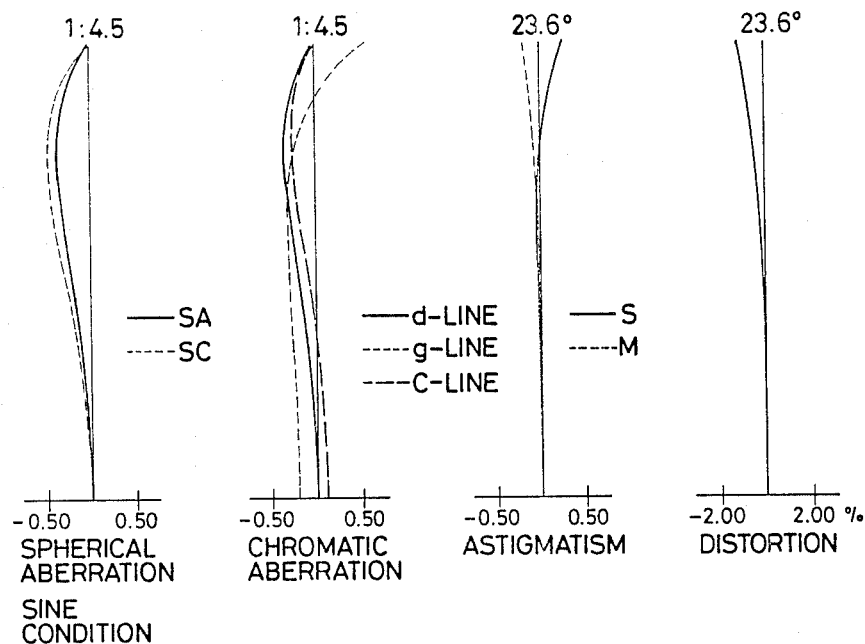
Figure 8C:
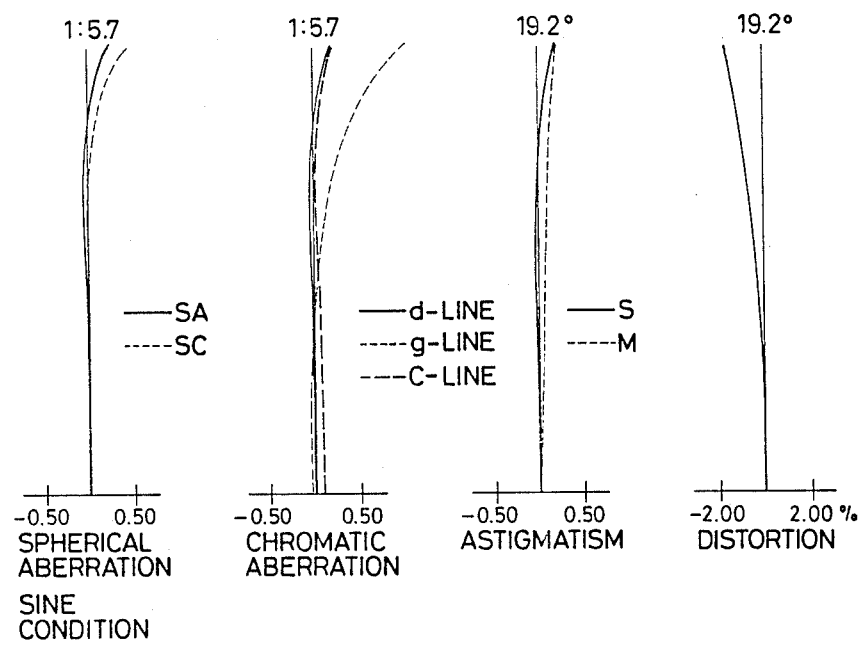
Figure 9:
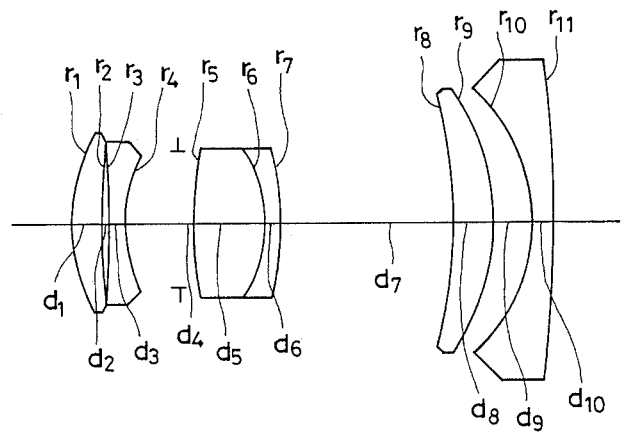
Figure 10A:
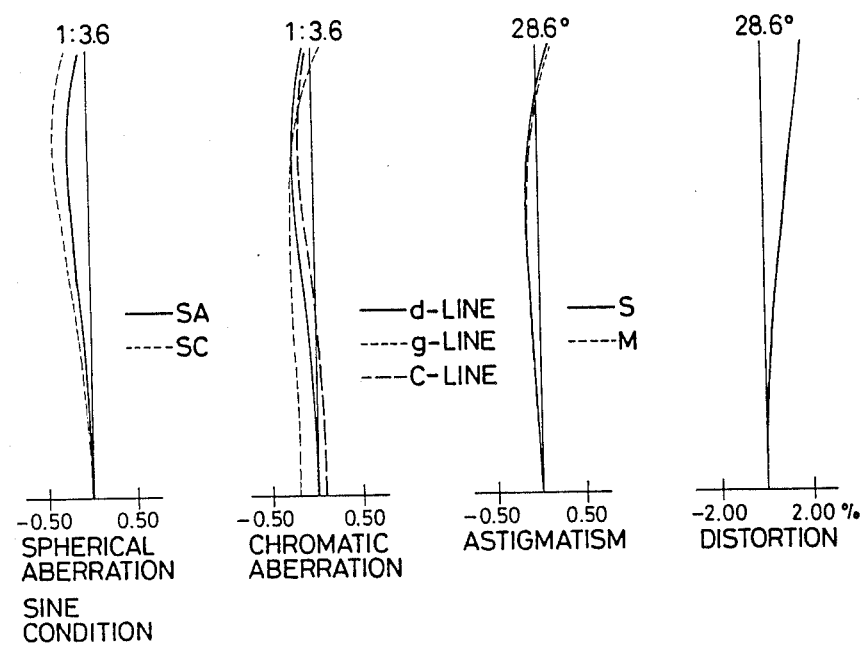
Figure 10B:
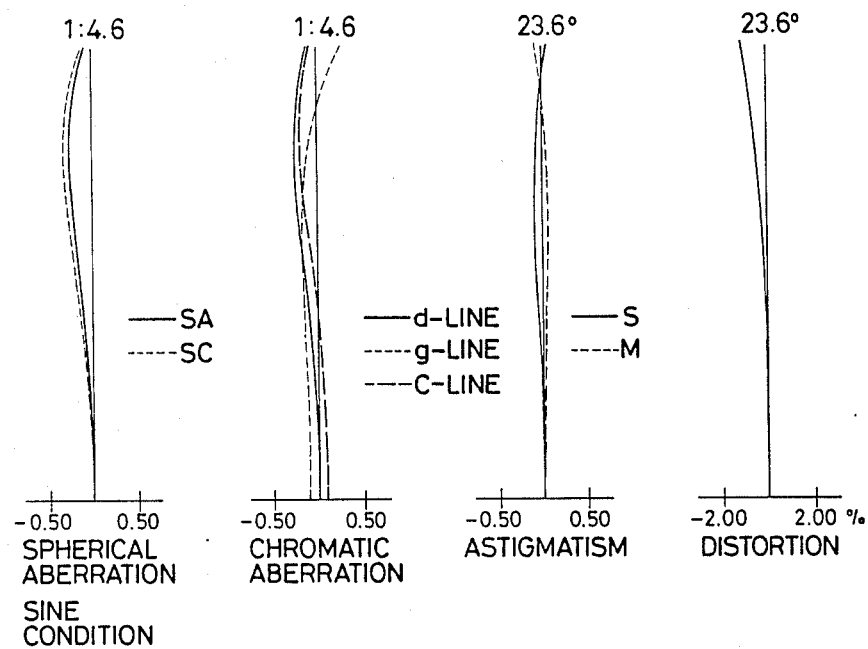
Figure 10C:
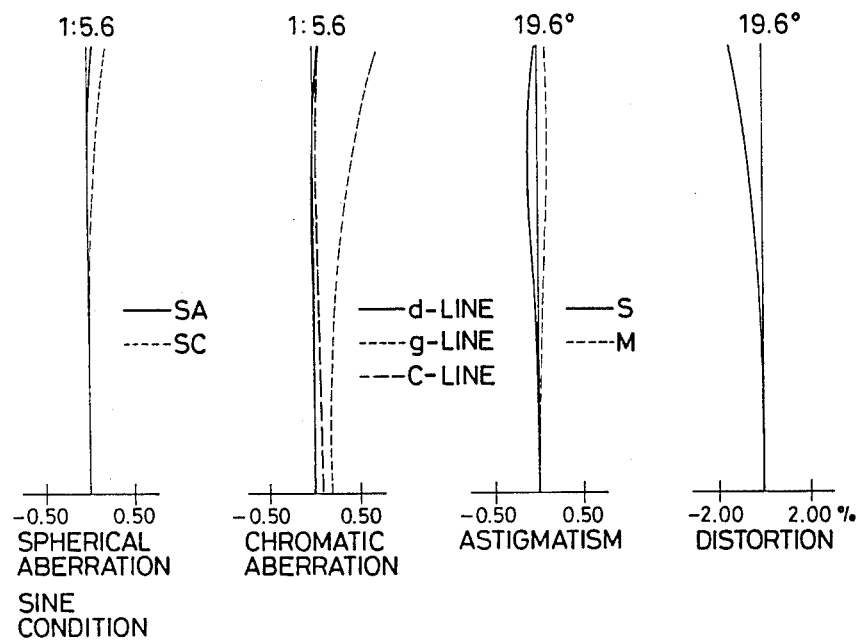
Figure 11:
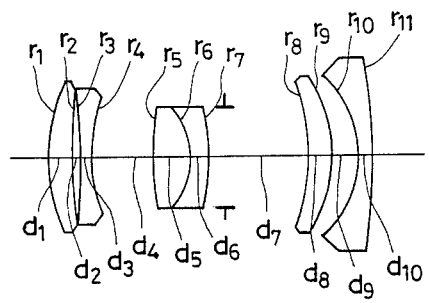
Figure 12A:
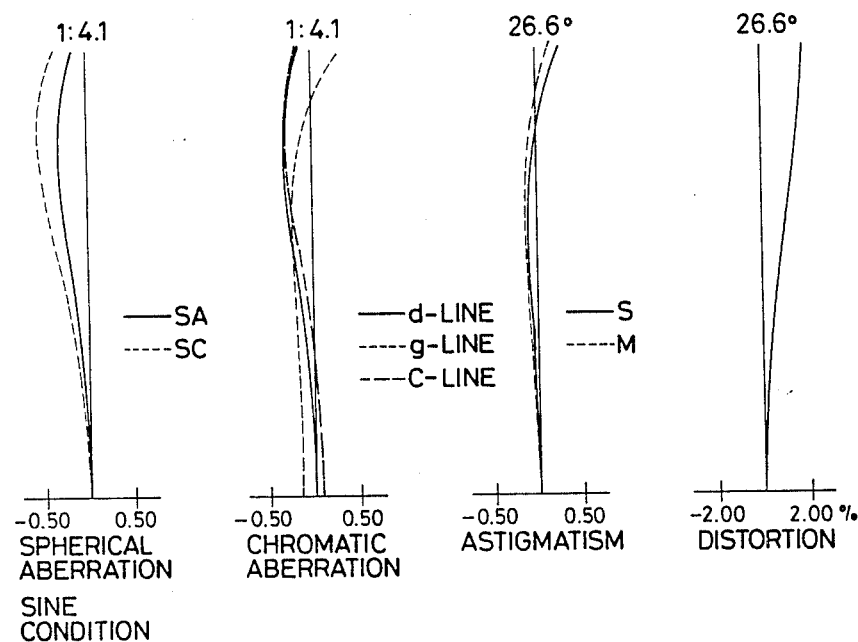
Figure 13:
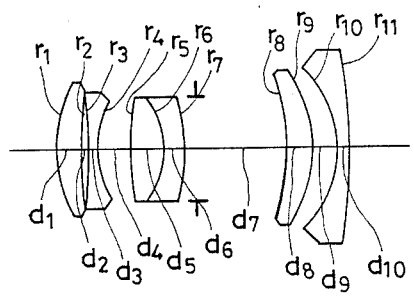
Figure 14A:
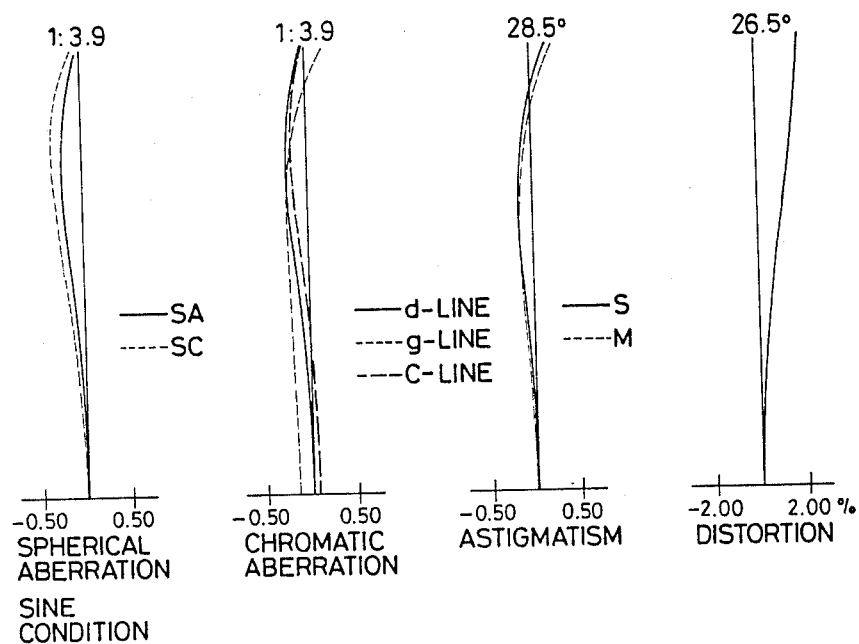
Figure 14B:
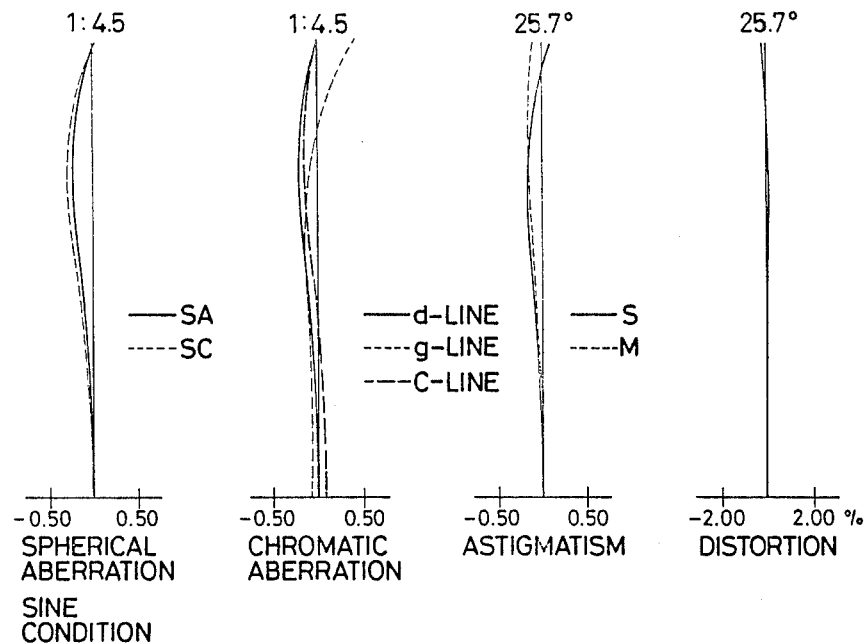
Figure 14C:
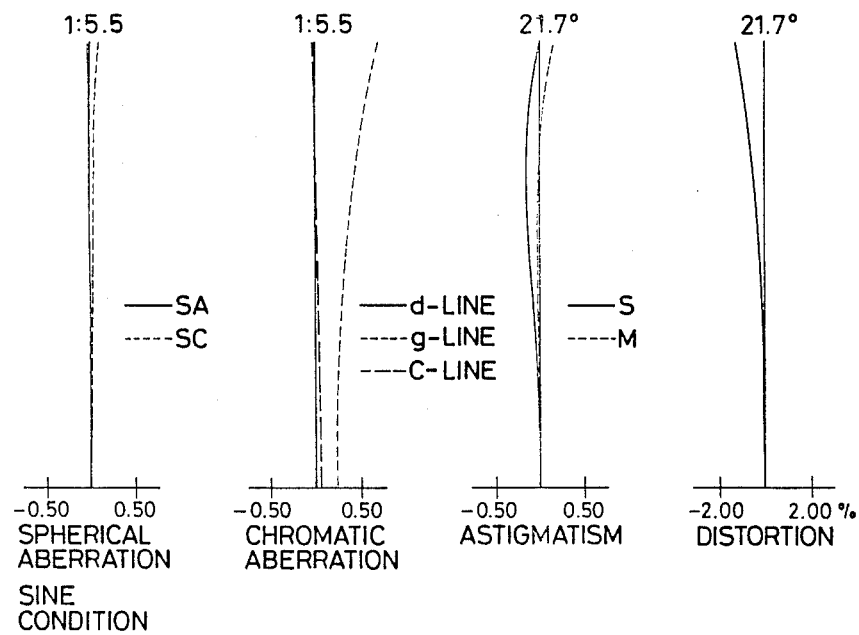
Figure 15:
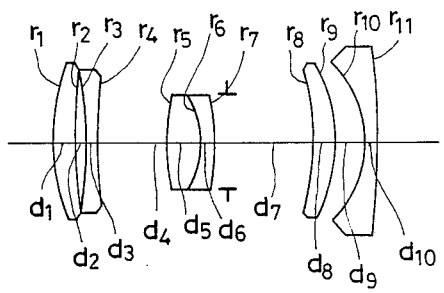
Figure 16A:
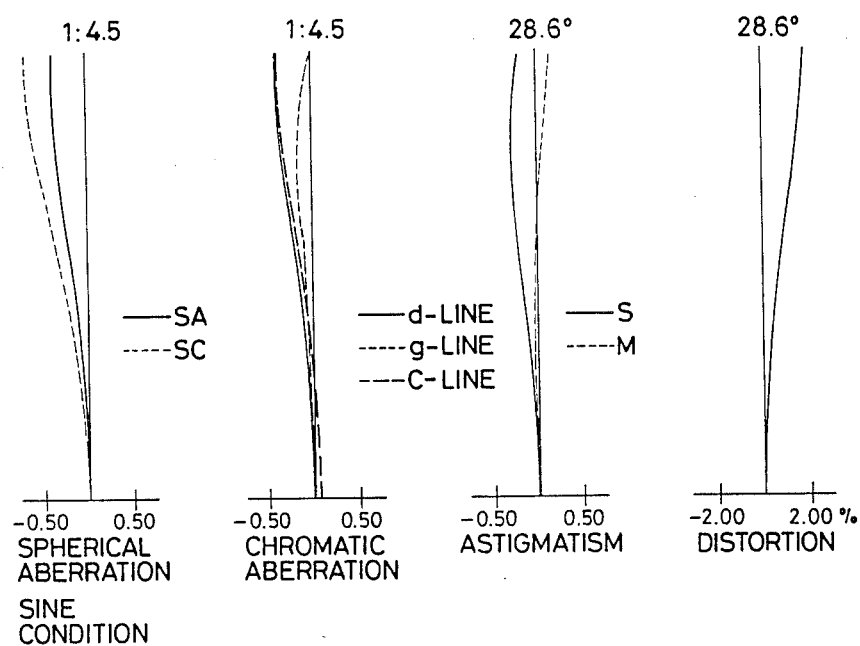
Figure 16B:
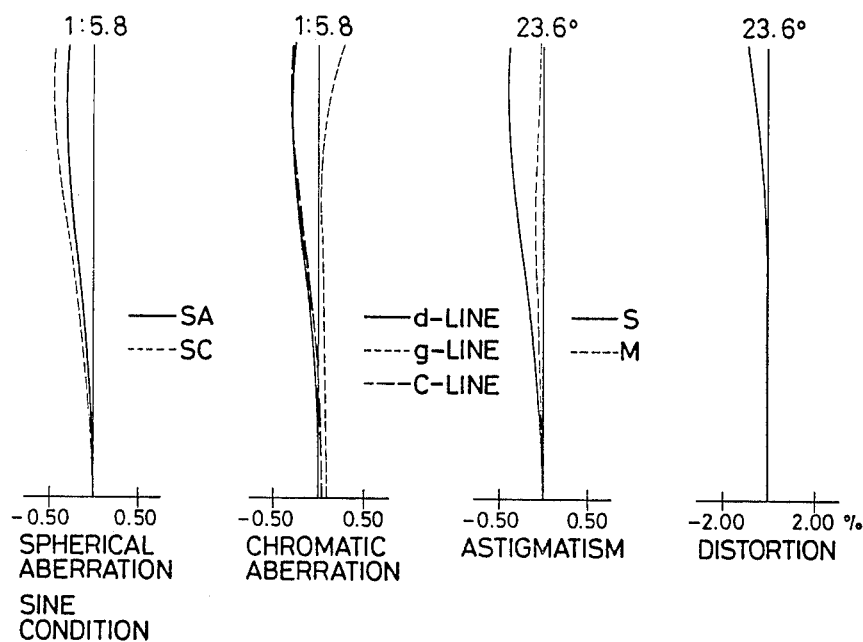
Figure 16C:
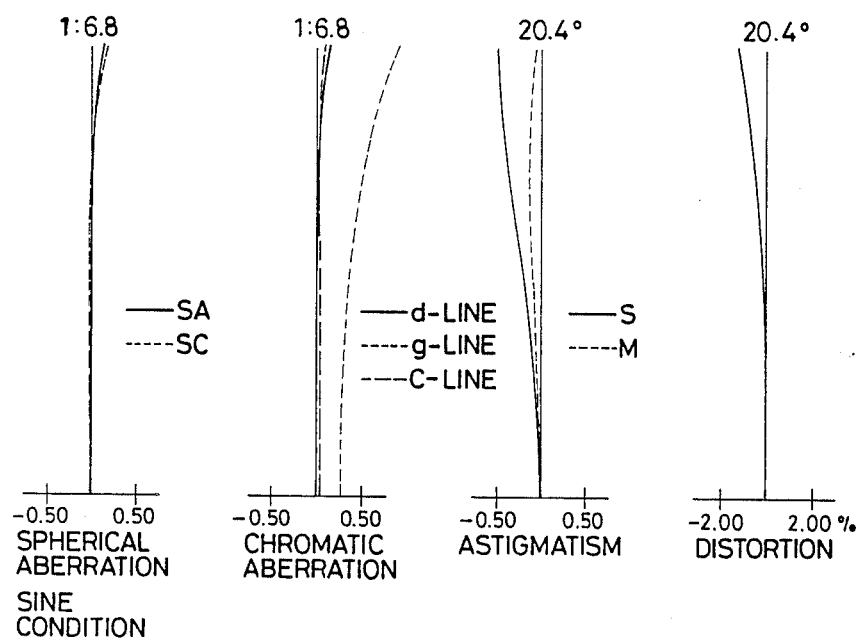
Figure 17:
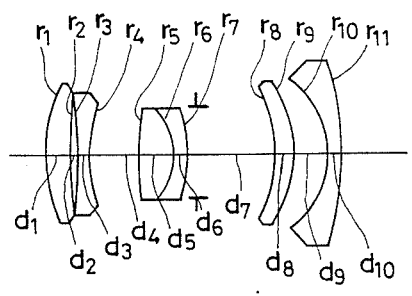
Figure 18A:
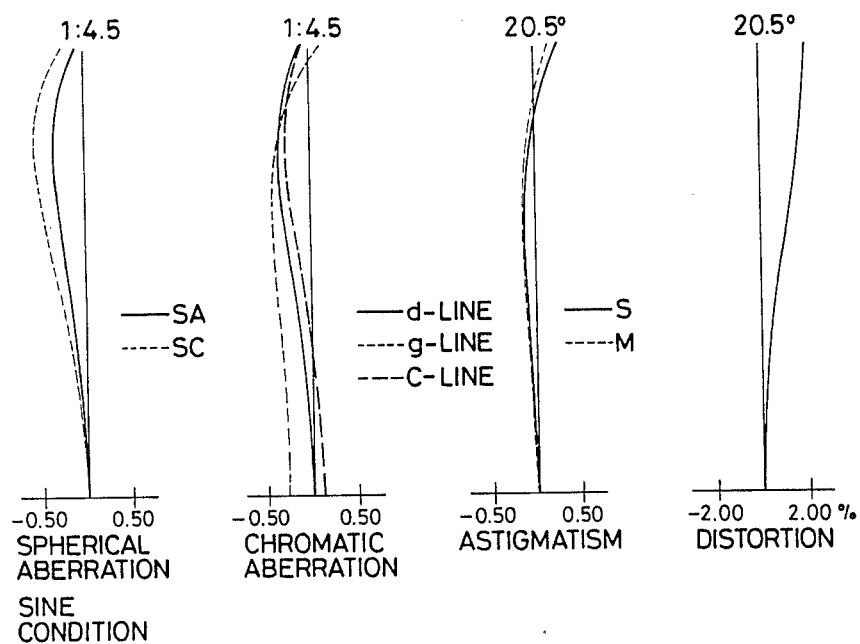
Figure 18B:
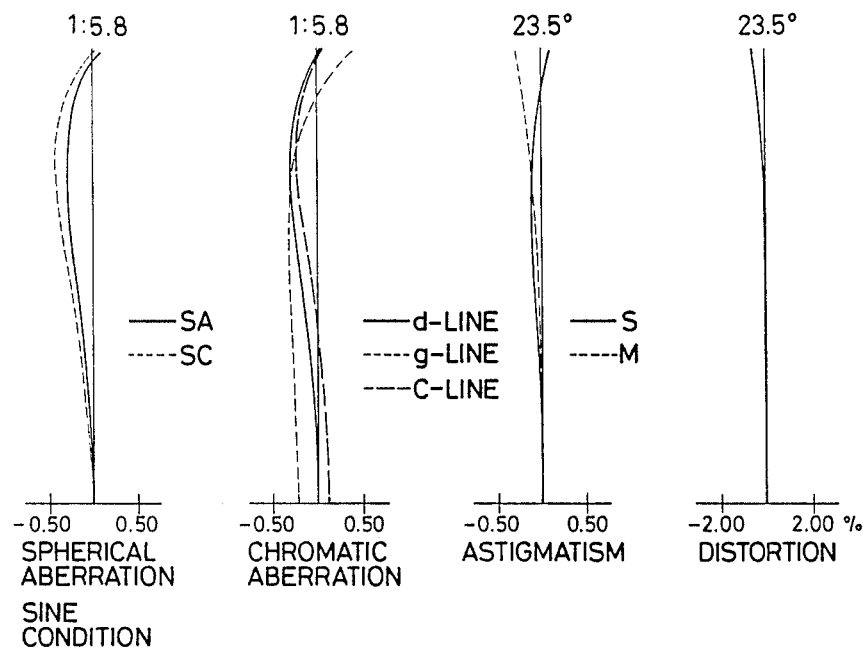
Figure 18C:
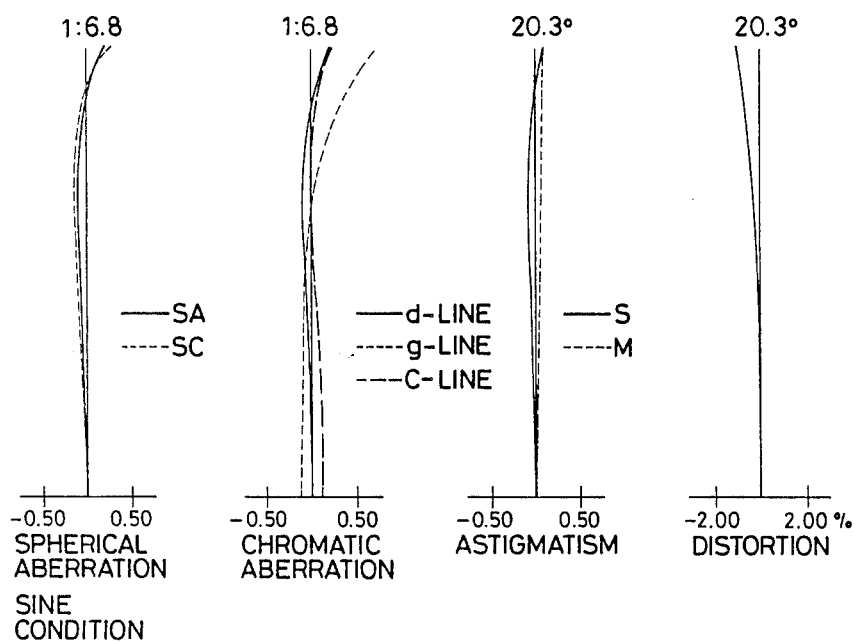
Figure 19:
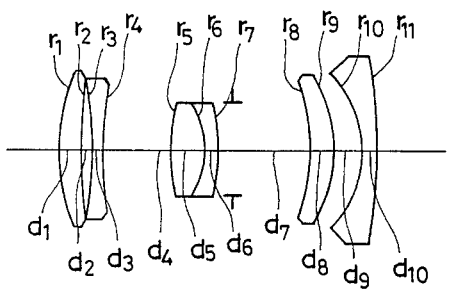
Figure 20A:
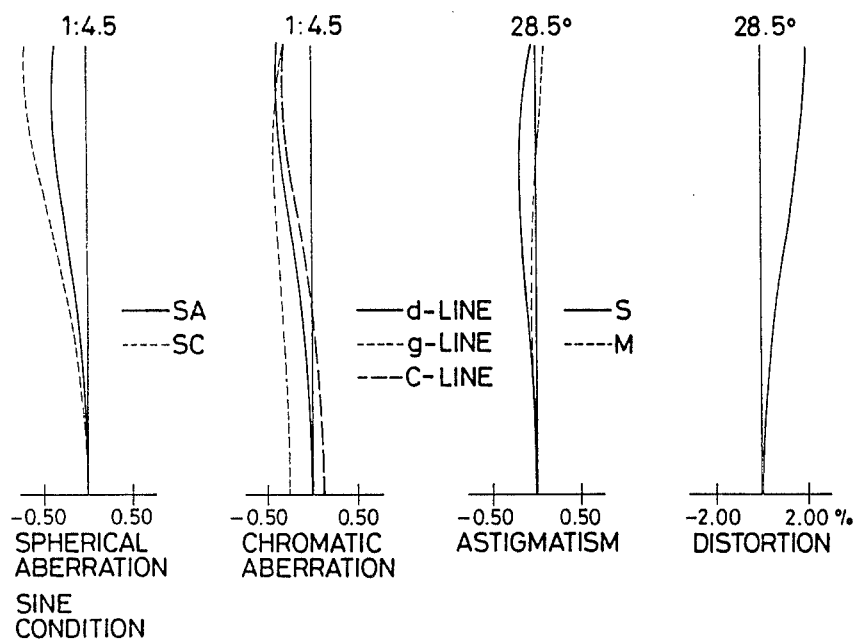
Figure 20B:
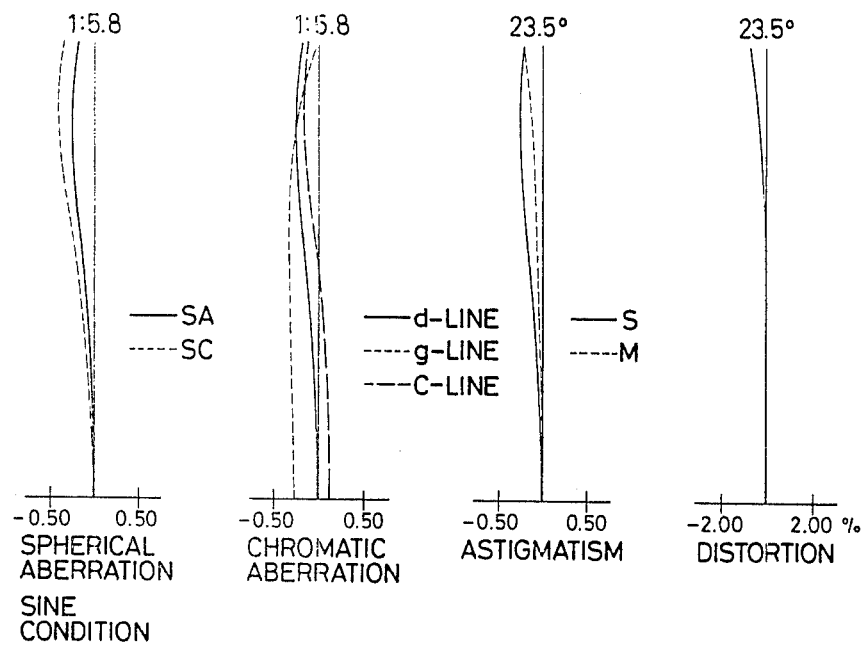
Figure 20C:
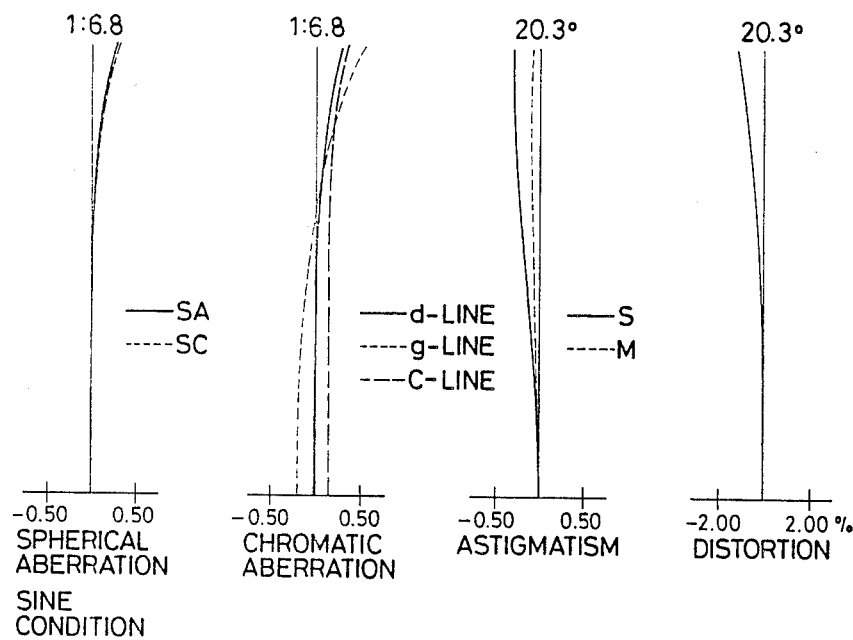

In a first preferred embodiment, the first lens unit having a negative focal length is composed, in order from the object side, of a positive lens element having a large-curvature convex surface on the object side and a negative lens element having a large curvature concave surface on the image side, and the second lens unit having a positive focal length is composed, in order from the object side, either of a cemented lens composed of a negative meniscus lens element having a convex surface directed toward the object side and a biconvex positive lens element, or of a cemented lens composed of a biconvex positive lens element and a negative meniscus lens element having a concave surface directed toward the object side.

In another preferred embodiment, the second lens group having a negative focal length is composed, in order from the object side, of positive meniscus lens element having a large-curvature convex surface on the image side and a negative meniscus lens element having a large-curvature concave surface on the object side, and the zoom lens system satisfies the following condition:

$$1.7 < N_{2n} \quad (8)$$

where $N_{2n}$: the refractive index, at the d-line, of the negative lens element in the second lens group.

In the zoom lens system of the present invention, a stop diaphragm is disposed between the first and second lens unit, or between the first and second lens groups.

In order to provide a high-performance zoom lens system that has a back focus greater than a certain value and which yet has a reduced overall length as a lens system, the present invention has as its core the following two features. First, an unconventional optical material is selected for use in the first lens unit of the first lens group. Secondly, the second lens unit of the first lens group comprises at least one negative lens element and at least one positive lens element, which is quite unique as compared with the conventional system in which the second lens unit is composed either of a single positive lens element or of two or three positive lens elements.

Condition (1) [or (1')] relates to the power of the first lens group of the zoom lens system of the present invention If the upper limit of this condition is exceeded, a condition results that is favorable for the purpose of producing a compact lens system, but at the same time, the power of the first lens group becomes so large that undesirably great changes occur in spherical and coma aberrations during zooming. If the lower limit of condition (1) is not reached, a condition results that is favorable for the purpose of aberrational compensation. At the same time though the focal length of the overall system change by only a small amount in response to a change in the distance between the first and second lens groups, and the amount by which these groups have to be displaced for zooming is as large as in the case of the prior art, which is by no means consistent with the purpose of attaining a compact zoom lens system.

Conditions (2) and (3) both relate to a negative lens element in the first lens unit. If condition (2) is not met, the curvature of field at the wide-angle end is highly likely to become overcompensated and, in particular, the astigmatism in the sagittal direction at a maximum view angle will be overcompensated.

Condition (3), taken in combination with condition (2), serves as a constrain on the range of optical materials that can be used in the negative lens element in the first lens unit. Common practice in the art dictates that negative lens elements in a positive lens group in a lens system should be made of a dense flint (SF) based optical material that does not satisfy condition (3). However, if the back focus of a lens system employing an SF based optical material is made larger than a certain value so as to satisfy condition (6) while the length of the overall system is reduced, it is impossible to properly compensate for the resulting chromatic aberration because it is undercompensated at the wide-angle end and overcompensated at the narrow angle end. Therefore, condition (3) is very important for the purpose of effectively compensating for chromatic aberration, with a balance being struck between this condition and each of conditions (4) [or (4')] and (5).

Conditions (4) [or (4')] and (5) both relate to the second lens unit in the first lens group. Conventionally, the second lens unit in a two-group type zoom lens system has been composed of either a single positive lens or two or more positive lenses. However, in order to render the back focus longer than a certain value and to reduce the length of the overall lens system, it is necessary for the second lens unit to include at least one negative lens element and at least one positive lens element and for the power and optical material should be selected so as to satisfy conditions (4) [or (4')] and (5).

If the lower limit of condition (4) [or (4')] is not reached, the power of a negative lens element in the second lens unit will be so great that overcompensation of chromatic aberration will occur. If the upper limit of condition (4) [or (4')] is exceeded, the power becomes too small to achieve effective compensation of chromatic aberration.

Example 4 given in the specification of Japanese patent application No. 170816/1985 describes a first lens group the final positive lens unit of which has a positive cemented lens composed of a negative and a positive lens element. However, the power of the negative lens element is very small ($f_S/f_{1bn} = -0.16$) and any novelty would seem to lie not in the first lens group, but in the second lens group (which is composed of three lens elements).

Nevertheless, the back focus of this prior art lens system is small (about 2 mm) and the value of $f_{BS}/f_S$ [in condition (6)] is 0.056 which is much smaller than the lower limit, 0.23 or 0.31, specified by the present invention. Thus, the zoom lens system disclosed in Japanese Unexamined Published patent application No. 170816/1985 is unable to attain the object of the present invention. Examples 2 and 3 given in the specification of Japanese Unexamined Published patent application No. 191216/1985 also describe a first lens group, the final positive lens unit of which has a positive cemented lens composed of a negative and a positive lens element. However, the power of the negative lens element is still insufficient ($f_S/f_{1bn} = -0.560$ in Example 2 and $-0.638$ in Example 3) to attain the object of the present invention, i.e., increasing the powers of the first and second lens group so as to provide a longer back focus and yet reducing the length of the overall lens system and the amount by which the two lens groups must be displaced to effect zooming.

If the lower limit of condition (5) is not reached, the balance with condition (3) is upset and effective compensation of chromatic aberration is difficult to achieve.

Condition (6) [or (6')] specifies the requirement that should be satisfied by the back focus in order to attain a compact camera body including various mechanisms such as zooming and auto-focusing units. If the lower limit of condition (6) [or (6')] is not reached, a condition result that is favorable for the purpose of reducing the length of the overall lens system, but, at the same time, the diameter of lenses in the rear group (i.e., second lens group) is increased, which is inconsistent with the purpose of attaining a compact camera body. If the upper limit of condition (6) [or (6')] is exceeded, a condition results that is favorable for the purpose of reducing the diameter of lenses in the rear group, but, at the same time, the length of the overall lens system is increased and a compact lens system cannot be attained.

Condition (7) states substantially the same requirement as condition (4) [or (4')] with respect to the compensation of chromatic aberration, but the specific rationale of this condition is to reduce the change, not only in chromatic aberration but also in spherical and coma aberrations. That results from zooming in the lens system of the present invention which, by satisfying condition (1), produces a stronger power in the first lens group than the system of the prior invention. If the upper limit of condition (7) is exceeded, the resulting lens system comes into the scope of the prior invention and the power of the divergent surface increases. If, under this situation, the first lens group has a positive power comparable to that afforded by the present invention, the three aberrations mentioned above will experience increased fluctuations as the zoom ratio varies. If, on the other hand, the lower limit of condition (7) is not reached, higher-order aberrations will develop and it will become particularly difficult to compensate for the spherical aberration that occurs at the narrow-angle position. Furthermore, the radii of curvature of the lenses in the second lens unit of the first lens group will become too small to avoid the increase in manufacturing cost.

Condition (8) relates to the second lens group. The second lens group used in the present invention is not much different from that employed in the prior art two-group type zoom lens system. However, according to the present invention, the negative lens element(s) in the second lens group is manufactured of an optical material having high refractive index, and this contributes to effective compensation of the curvature of field that occurs at the wide-angle end. If condition (8) is not met, the astigmatism that occurs in the marginal lens portion in the sagittal direction will be overcompensated, which is dramatically observed when the overall system is at the wide-angle position.

A stop diaphragm may be disposed either (a) between the first and second lens units, or (b) between the first and second lens groups. Case (a) is advantageous for the purpose of reducing the length of the overall lens system, whereas case (b) is advantageous for simplifying the structure of the auto-focusing mechanism and the assembly operations needed for the same.

EXAMPLES

Examples 1–10 of the present invention are described in the following data, in which f signifies the focal length, $\omega$ = half view angle, $f_B$ = back focus, r = radius of curvature of an individual lens surface, d = lens thickness or the aerial distance between lens surfaces, N = refractive index at the d-line of an individual lens element, and $\nu$ = Abbe number of an individual lens element.

EXAMPLE 1

| 1:3.6–5.6 | | f = 39.0–61.0 | |
| $\omega$ = 28.6°–19.8° | | $f_B$ = 12.00–41.72 | |

| surface No. | r | d | N | $\nu$ |
|---|---|---|---|---|
| 1 | 14.130 | 2.322 | 1.80610 | 40.9 |
| 2 | 55.811 | 0.602 | | |
| 3 | −63.216 | 1.300 | 1.74950 | 35.2 |
| 4 | 13.268 | 4.983 | | |
| 5 | 28.998 | 1.300 | 1.80518 | 25.4 |
| 6 | 14.533 | 5.500 | 1.72000 | 43.7 |
| 7 | −23.609 | 13.409–2.00 | | |
| 8 | −38.677 | 3.082 | 1.68893 | 31.1 |
| 9 | −17.516 | 2.871 | | |
| 10 | −14.261 | 1.610 | 1.83400 | 37.2 |
| 11 | −89.753 | | | |

| $f_s/f_I$ = 1.291 | $N_{Ian}$ = 1.7495 |
| $\nu_{Ian}$ = 35.2 | $f_s/f_{1bn}$ = −1.03 |
| $\nu_{Ibp} - \nu_{Ibn}$ = 18.3 | |
| $f_{BS}/f_S$ = 0.308 | $N_{2n}$ = 1.834 |

EXAMPLE 2

| 1:3.5–5.6 | f = 39.1–63.0 |

-continued

| | $\omega = 28.5°-19.2°$ | | $f_B = 12.00-43.06$ | |
|---|---|---|---|---|
| surface No. | r | d | N | ν |
| 1 | 14.011 | 2.583 | 1.80610 | 40.9 |
| 2 | 55.181 | 0.628 | | |
| 3 | −71.814 | 1.300 | 1.83400 | 37.2 |
| 4 | 13.874 | 5.119 | | |
| 5 | 23.026 | 1.300 | 1.80518 | 25.4 |
| 6 | 10.447 | 5.500 | 1.70154 | 41.2 |
| 7 | −23.411 | 12.937-1.855 | | |
| 8 | −29.863 | 2.872 | 1.74077 | 27.8 |
| 9 | −16.676 | 3.151 | | |
| 10 | −13.506 | 1.610 | 1.83400 | 37.2 |
| 11 | −66.072 | | | |

$f_s/f_l = 1.319$  $N_{lan} = 1.834$
$\nu_{lan} = 37.2$  $f_s/f_{lbn} = -1.57$
$\nu_{lbp}-\nu_{lbn} = 15.8$
$f_{BS}/f_S = 0.307$  $N_{2n} = 1.834$

EXAMPLE 3

| | 1:3.6–5.6 | | $f = 39.0-61.0$ | |
|---|---|---|---|---|
| | $\omega = 28.5°-19.8°$ | | $f_B = 12.00-40.93$ | |
| surface No. | r | d | N | ν |
| 1 | 14.763 | 2.727 | 1.80610 | 40.9 |
| 2 | 57.696 | 0.807 | | |
| 3 | −56.002 | 1.300 | 1.83400 | 37.2 |
| 4 | 14.481 | 5.574 | | |
| 5 | 22.966 | 1.300 | 1.80518 | 25.4 |
| 6 | 10.205 | 4.169 | 1.70154 | 41.2 |
| 7 | −22.557 | 14.414-3.50 | | |
| 8 | −36.397 | 3.023 | 1.74077 | 27.8 |
| 9 | −17.002 | 2.686 | | |
| 10 | −13.607 | 1.500 | 1.83400 | 37.2 |
| 11 | −90.018 | | | |

$f_s/f_l = 1.302$  $N_{lan} = 1.834$
$\nu_{lan} = 37.2$  $f_s/f_{lbn} = -1.63$
$\nu_{lbp}-\nu_{lbn} = 15.8$
$f_{BS}/f_S = 0.308$  $N_{2n} = 1.834$

EXAMPLE 4

| | 1:3.5–5.6 | | $f = 39.0-63.0$ | |
|---|---|---|---|---|
| | $\omega = 28.6°-19.2°$ | | $f_B = 12.00-42.05$ | |
| surface No. | r | d | N | ν |
| 1 | 14.393 | 2.867 | 1.77250 | 49.6 |
| 2 | 64.160 | 0.789 | | |
| 3 | −56.302 | 1.300 | 1.83481 | 42.7 |
| 4 | 13.911 | 5.479 | | |
| 5 | 22.099 | 1.300 | 1.80518 | 25.4 |
| 6 | 9.853 | 4.688 | 1.70154 | 41.2 |
| 7 | −21.931 | 13.792-3.364 | | |
| 8 | −29.677 | 2.883 | 1.74077 | 27.8 |
| 9 | −16.147 | 2.901 | | |
| 10 | −13.083 | 1.500 | 1.83400 | 37.2 |
| 11 | −70.015 | | | |

$f_s/f_l = 1.336$  $N_{lan} = 1.835$
$\nu_{lan} = 42.7$  $f_s/f_{lbn} = -1.67$
$\nu_{lbp}-\nu_{lbn} = 15.8$
$f_{BS}/f_S = 0.308$  $N_{2n} = 1.834$

EXAMPLE 5

| | 1:3.6–5.6 | | $f = 39.0-61.0$ | |
|---|---|---|---|---|
| | $\omega = 28.6°-19.8°$ | | $f_B = 12.00-41.36$ | |
| surface No. | r | d | N | ν |
| 1 | 13.609 | 2.384 | 1.77250 | 49.6 |
| 2 | 56.435 | 0.562 | | |
| 3 | −74.178 | 1.300 | 1.76200 | 40.1 |
| 4 | 13.196 | 5.235 | | |
| 5 | 30.928 | 5.500 | 1.70154 | 41.2 |
| 6 | −10.888 | 1.300 | 1.80518 | 25.4 |
| 7 | −21.039 | 13.286-2.00 | | |
| 8 | −40.228 | 3.086 | 1.68893 | 31.1 |
| 9 | −17.609 | 2.951 | | |
| 10 | −14.142 | 1.610 | 1.83400 | 37.2 |
| 11 | −94.291 | | | |

$f_s/f_l = 1.290$  $N_{lan} = 1.762$
$\nu_{lan} = 40.1$  $f_s/f_{lbn} = -1.31$
$\nu_{lbp}-\nu_{lbn} = 15.8$
$f_{BS}/f_S = 0.308$  $N_{2n} = 1.834$

EXAMPLE 6

| | 1:4.1–6.4 | | $f = 39.03-60.00$ | |
|---|---|---|---|---|
| | $\omega = 28.6°-20.1°$ | | $f_B = 14.70-39.50$ | |
| surface No. | r | d | N | ν |
| 1 | 16.541 | 2.69 | 1.78590 | 44.2 |
| 2 | 66.300 | 0.84 | | |
| 3 | −54.850 | 1.10 | 1.79952 | 42.2 |
| 4 | 18.580 | 6.25 | | |
| 5 | 25.294 | 3.91 | 1.70154 | 41.2 |
| 6 | −8.327 | 2.09 | 1.80518 | 25.4 |
| 7 | −20.500 | 10.30-2.88 | | |
| 8 | −25.160 | 2.42 | 1.80518 | 25.4 |
| 9 | −14.420 | 2.76 | | |
| 10 | −11.336 | 1.40 | 1.83400 | 37.2 |
| 11 | −63.450 | | | |

$f_s/f_l = 1.475$  $N_{lan} = 1.7995$
$\nu_{lan} = 42.2$  $f_s/f_{lbn} = -2.07$
$\nu_{lbp}-\nu_{lbn} = 15.8$  $f_{BS}-f_S = 0.377$
$f_S/f_{lbc} = -0.486$  $N_{2n} = 1.834$

EXAMPLE 7

| | 1:3.9–5.5 | | $f = 39.08-55.00$ | |
|---|---|---|---|---|
| | $\omega = 28.5°-21.7°$ | | $f_B = 15.07-36.65$ | |
| surface No. | r | d | N | ν |
| 1 | 13.120 | 2.67 | 1.77250 | 49.6 |
| 2 | 50.845 | 0.80 | | |
| 3 | −46.220 | 1.10 | 1.76200 | 40.1 |
| 4 | 12.500 | 3.33 | | |
| 5 | 26.041 | 3.41 | 1.70154 | 41.2 |
| 6 | −9.066 | 2.26 | 1.80518 | 25.4 |
| 7 | −17.287 | 10.53-2.87 | | |
| 8 | −26.946 | 2.68 | 1.67270 | 32.1 |
| 9 | −13.900 | 2.38 | | |
| 10 | −11.891 | 1.40 | 1.83400 | 37.2 |
| 11 | −50.752 | | | |

$f_s/f_l = 1.415$  $N_{lan} = 1.762$
$\nu_{lan} = 40.1$  $f_s/f_{lbn} = -1.45$
$\nu_{lbp}-\nu_{lbn} = 15.8$  $f_{BS}-f_S = 0.386$
$f_S/f_{lbc} = -0.447$  $N_{2n} = 1.834$

EXAMPLE 8

| | 1:4.5–6.8 | | $f = 39.00-59.00$ | |
|---|---|---|---|---|
| | $\omega = 28.6°-20.4°$ | | $f_B = 14.94-38.66$ | |
| surface No. | r | d | N | ν |
| 1 | 21.757 | 2.20 | 1.77250 | 49.6 |

-continued

| | | | | |
|---|---|---|---|---|
| 2 | 53.695 | 1.24 | | |
| 3 | −36.993 | 1.10 | 1.80610 | 40.9 |
| 4 | 72.480 | 7.23 | | |
| 5 | 25.345 | 3.44 | 1.66755 | 41.9 |
| 6 | −9.300 | 1.50 | 1.80518 | 25.4 |
| 7 | −22.321 | 10.20−2.89 | | |
| 8 | −30.666 | 2.33 | 1.80518 | 25.4 |
| 9 | −15.911 | 2.83 | | |
| 10 | −11.911 | 1.40 | 1.83400 | 37.2 |
| 11 | −87.014 | | | |

| | |
|---|---|
| $f_S/f_I = 1.465$ | $N_{lan} = 1.8061$ |
| $\nu_{lan} = 40.9$ | $f_S/f_{lbn} = -1.869$ |
| $\nu_{lbp} - \nu_{lbn} = 16.5$ | $f_{BS} - f_S = 0.383$ |
| $f_S/f_{lbc} = -0.577$ | $N_{2n} = 1.834$ |

EXAMPLE 9

| 1:4.5–6.8 | | $f = 39.10-59.00$ | | |
|---|---|---|---|---|
| $\omega = 28.5°-20.3°$ | | $f_B = 14.65-36.29$ | | |
| surface No. | r | d | N | $\nu$ |
| 1 | 14.690 | 2.64 | 1.77250 | 49.6 |
| 2 | 57.056 | 0.79 | | |
| 3 | −52.030 | 1.10 | 1.80610 | 40.9 |
| 4 | 16.751 | 5.14 | | |
| 5 | 22.143 | 3.66 | 1.65016 | 39.4 |
| 6 | −7.568 | 1.50 | 1.80518 | 25.4 |
| 7 | −15.817 | 9.10–3.47 | | |
| 8 | −14.987 | 2.11 | 1.80518 | 25.4 |
| 9 | −11.671 | 3.34 | | |
| 10 | −10.046 | 1.40 | 1.83400 | 37.2 |
| 11 | −33.972 | | | |

| | |
|---|---|
| $f_S/f_I = 1.595$ | $N_{lan} = 1.8061$ |
| $\nu_{lan} = 40.9$ | $f_S/f_{lbn} = -1.99$ |
| $\nu_{lbp} - \nu_{lbn} = 14.0$ | $f_{BS} - f_S = 0.375$ |
| $f_S/f_{lbc} = -0.801$ | $N_{2n} = 1.834$ |

EXAMPLE 10

| 1:4.5–6.8 | | $f = 39.10-59.00$ | | |
|---|---|---|---|---|
| $\omega = 28.5°-20.3°$ | | $f_B = 14.69-36.90$ | | |
| surface No. | r | d | N | $\nu$ |
| 1 | 20.744 | 2.30 | 1.77250 | 49.6 |
| 2 | 57.261 | 1.12 | | |
| 3 | −40.037 | 1.10 | 1.80610 | 40.9 |
| 4 | 48.238 | 7.15 | | |
| 5 | 23.607 | 3.49 | 1.66998 | 39.3 |
| 6 | −9.000 | 1.50 | 1.80518 | 25.4 |
| 7 | −21.824 | 9.70–3.42 | | |
| 8 | −22.481 | 2.43 | 1.80518 | 25.4 |
| 9 | −14.283 | 3.07 | | |
| 10 | −11.004 | 1.40 | 1.83400 | 37.2 |
| 11 | −54.022 | | | |

| | |
|---|---|
| $f_S/f_I = 1.531$ | $N_{lan} = 1.8061$ |
| $\nu_{lan} = 40.9$ | $f_S/f_{lbn} = -1.95$ |
| $\nu_{lbp} - \nu_{lbn} = 13.9$ | $f_{BS} - f_S = 0.376$ |
| $f_S/f_{lbc} = -0.587$ | $N_{2n} = 1.834$ |

What is claimed is:

1. In a zoom lens system for use in a compact camera that comprises, in order from the object side, a first lens group having a positive focal length and a second lens group having a negative focal length, said zoom lens system performing zooming by changing the distance between said first and second lens groups, the improvement wherein said first lens group comprises a first lens unit having a negative focal length that comprises a positive lens element and a negative lens element, and a second lens unit having a positive focal length disposed on the image side of said first lens unit and which comprises a negative lens element and a positive lens element, said zoom lens system satisfying the following conditions:

$1.2 < f_S/f_1 < 1.5;$ (1)

$1.69 < N_{1an};$ (2)

$34 < \nu_{1an};$ (3)

$-2.0 < f_S/f_{1bn} < -0.7;$ (4)

$9 - \nu_{1bp} - \nu_{1bn};$ and (5)

$0.23 < f_{BS}/f_S < 0.5$ (6)

wherein $f_S$: the focal length of the overall system at the wide-angle end;

$f_1$: the focal length of the first lens group;

$N_{1an}$: the refractive index, at the d-line, of the negative lens element in the first lens unit;

$\nu_{1an}$: the abbe number of the negative lens element in the first lens unit;

$f_{1bn}$: the focal length of the negative lens element in the second lens unit;

$\nu_{1bp}$: the Abbe number of the positive lens element in the second lens unit;

$\nu_{1bn}$: the Abbe number of the negative lens element in the second lens unit; and $f_{BS}$: the back focus of the overall system at the wide-angle end.

2. The compact lens system according to claim 1, wherein the first lens unit having a negative focal length comprises, in order from the object side, of a positive lens element having a large-curvature convex surface on the object side and a negative lens element having a large-curvature concave surface on the image side, and the second lens unit having a positive focal length comprising, in order from the object side, a cemented lens composed of a negative meniscus lens element having a convex surface directed toward the object side and a bioconvex positive lens element.

3. The compact lens system according to claim 1, wherein the first lens unit having a negative focal length comprises in order from the object side, of a positive lens element having a large-curvature convex surface on the object side and a negative lens element having a large-curvature concave surface on the image side, and the second lens unit having a positive focal length comprising, in order from the object side, a cemented lens composed of a biconvex positive lens element and a negative meniscus lens element having a concave surface directed toward the object side.

4. The zoom lens system according to Claim 1, wherein the second lens group having a negative focal length comprises, in order from the object side, of a positive meniscus lens element having a large-curvature convex surface on the image side and a negative meniscus lens element having a large-curvature concave surface on the side, said zoom lens system satisfying the following condition:

$1.7 < N_{2n}$ (8)

where $N_{2n}$: the refractive index at the d-line of the negative lens element in the second lens group.

5. The zoom lens system according to claim 1, further comprising a stop diaphragm disposed between the first and second lens groups.

6. The zoom lens system according to claim 1, further comprising a stop diaphragm disposed between the first and second lens units.

7. In a zoom lens system for use in a compact camera that comprises, in order from the object side, a first lens group having a positive focal length and a second lens group having a negative focal length, said zoom lens system performing zooming by changing the distance between said first and second lens groups, the improvement wherein said first lens group comprises a first lens unit having a negative focal length that consists of a positive lens element having a strong-curvature convex surface on the object side and a biconcave negative lens element, and a second lens unit having a positive focal length that is situated on the image side of said first lens unit and which comprises a cemented lens composed of a biconvex positive lens element and a negative meniscus lens element having a concave surface directed toward the object side, said zoom lens system satisfying the following conditions:

$$1.35 < f_S/f_1 < 1.7; \tag{1}$$

$$1.69 < N_{1an}; \tag{2}$$

$$34 < \nu_{1an}; \tag{3}$$

$$-2.5 < f_S/f_{1bn} < -1.0 \tag{4}$$

$$9 < \nu_{1bp} - \nu_{1bn}; \tag{5}$$

$$0.31 < f_{BS}/f_S < 0.5; \text{ and} \tag{6}$$

$$-1.0 < f_S/f_{1bc} < -0.41 \tag{7}$$

wherein
- $f_S$: the focal length of the overall system at the side angle end;
- $f_1$: the focal length of the first lens group;
- $N_{1an}$: the refractive index, at the d-line of the negative lens element in the first lens unit;
- $\nu_{1an}$: the Abbe number of the negative lens element in the first lens unit;
- $f_{1bn}$: the focal length of the negative lens element in the second lens unit;
- $\nu_{1bp}$: the Abbe number of the positive lens element in the second lens unit;
- $\nu_{1bn}$: the Abbe number of the negative lens element in the second lens unit;
- $f_{BS}$: the back focus of the overall system at the wide-angle end; and
- $f_{1bc}$: the focal length of the cemented surface of the second lens unit.

8. The zoom lens system according to claim 7, wherein the second lens group having a negative focal length comprise, in order from the object side, a positive meniscus lens element having a large-curvature convex surface on the image side and a negative meniscus lens element having a large-curvature concave surface on the object side, said zoom lens system satisfying the following condition:

$$1.7 < N_{2n} \tag{8}$$

where $N_{2n}$: the refractive index, at the d-line, of the negative lens element in the second lens group.

9. The zoom lens system according to claim 7, further comprising a stop diaphragm disposed between first and second lens groups.

10. The zoom lens system according to claim 7, further comprising a stop diaphragm disposed between the first and second lens units.

* * * * *

UNITED STATES PATENT AND TRADEMARK OFFICE
CERTIFICATE OF CORRECTION

PATENT NO. : 4,818,081
DATED : April 4, 1989
INVENTOR(S) : Takayuki ITO

It is certified that error appears in the above-indentified patent and that said Letters Patent is hereby corrected as shown below:

Column 10, line 14 (claim 1, line 24), change "9-v" to ---9<v---.

Signed and Sealed this

Nineteenth Day of April, 1994

Attest:

BRUCE LEHMAN

Attesting Officer

Commissioner of Patents and Trademarks